(12) United States Patent
Halberstadt

(10) Patent No.: US 10,432,099 B2
(45) Date of Patent: Oct. 1, 2019

(54) RESONANT CONVERTER CIRCUIT HAVING DIFFERENT AC AND DC TRANSFER FUNCTIONS

(71) Applicant: NXP B.V., Eindhoven (NL)

(72) Inventor: Hans Halberstadt, Groesbeek (NL)

(73) Assignee: NXP B.V., Eindhoven (NL)

( * ) Notice: Subject to any disclaimer, the term of this patent is extended or adjusted under 35 U.S.C. 154(b) by 74 days.

(21) Appl. No.: 15/267,350

(22) Filed: Sep. 16, 2016

(65) Prior Publication Data

US 2017/0093297 A1    Mar. 30, 2017

(30) Foreign Application Priority Data

Sep. 30, 2015 (EP) ..................................... 15187684

(51) Int. Cl.
*H02M 3/335* (2006.01)
*H02M 1/14* (2006.01)
(Continued)

(52) U.S. Cl.
CPC ....... *H02M 3/33569* (2013.01); *H02M 1/143* (2013.01); *H02M 3/335* (2013.01);
(Continued)

(58) Field of Classification Search
CPC ........ H02M 1/42; H02M 1/44; H02M 1/4241; H02M 2007/4815; H02M 2001/0058;
(Continued)

(56) References Cited

U.S. PATENT DOCUMENTS

2008/0238379 A1    10/2008    Telefus et al.
2015/0197256 A1    7/2015    Chedal Bornu
(Continued)

FOREIGN PATENT DOCUMENTS

CN    203387407 U    1/2014
CN    104935171 A    9/2015

OTHER PUBLICATIONS

Extended European Search Report for Patent Appln. No. 15187684.4 (dated Mar. 23, 2016).

*Primary Examiner* — Fred E Finch, III
*Assistant Examiner* — Rafael O. De León Domenech

(57) ABSTRACT

A resonant converter circuit comprising a controller having a Vbusdiv-input-terminal configured to receive a Vbusdiv-input-signal; and a Vbus-compensation-network. The Vbus-compensation-network comprising: a Vbus-input-terminal configured to receive a bus-voltage-signal; and a Vbusdiv-output-terminal configured to provide the Vbusdiv-input-signal to the controller; a reference terminal; an AC-impedance-network connected between the Vbus-input-terminal and the Vbusdiv-output-terminal, wherein the AC-impedance-network is configured to apply an AC transfer function to the received bus voltage signal; a DC-impedance-network connected between the Vbus-input-terminal and the Vbusdiv-output-terminal, wherein the DC-impedance-network is configured to apply a DC transfer function to the received bus voltage signal. The DC transfer function is different to the AC transfer function. The controller is configured to control operation of a resonant converter in accordance with the Vbusdiv-input-signal.

16 Claims, 6 Drawing Sheets

(51) Int. Cl.
  *H02M 3/337*      (2006.01)
  *H02M 1/00*       (2006.01)

(52) U.S. Cl.
  CPC .............. *H02M 3/337* (2013.01); *H02M 1/00* (2013.01); *H02M 2001/0022* (2013.01); *Y02B 70/1433* (2013.01); *Y02P 80/112* (2015.11)

(58) Field of Classification Search
  CPC ... H02M 3/337; H02M 3/3378; H02M 3/3382
  See application file for complete search history.

(56) References Cited

U.S. PATENT DOCUMENTS

2015/0198634 A1* 7/2015 Brinlee .................. G01R 31/28
                                                          324/72.5
2015/0244274 A1* 8/2015 Fahlenkamp ..... H02M 3/33507
                                                          363/21.15

* cited by examiner

RESONANT CONVERTER CIRCUIT HAVING DIFFERENT AC AND DC TRANSFER FUNCTIONS

CROSS-REFERENCE TO RELATED APPLICATIONS

This application claims the priority under 35 U.S.C. § 119 of European patent application no. 15187684.4, filed Sep. 30, 2015 the contents of which are incorporated by reference herein.

The present disclosure relates to resonant converter circuits, including circuits for controlling LLC resonant converters.

According to a first aspect of the present disclosure there is provided a resonant converter circuit comprising:
- a controller having a Vbusdiv-input-terminal configured to receive a Vbusdiv-input-signal; and
- a Vbus-compensation-network comprising:
  - a Vbus-input-terminal configured to receive a bus-voltage-signal;
  - a Vbusdiv-output-terminal configured to provide the Vbusdiv-input-signal to the controller;
  - a reference terminal;
  - an AC-impedance-network connected between the Vbus-input-terminal and the Vbusdiv-output-terminal, wherein the AC-impedance-network is configured to apply an AC transfer function to the received bus voltage signal; and
  - a DC-impedance-network connected between the Vbus-input-terminal and the Vbusdiv-output-terminal, wherein the DC-impedance-network is configured to apply a DC transfer function to the received bus voltage signal, wherein the DC transfer function is different to the AC transfer function;
- wherein the controller is configured to control operation of a resonant converter in accordance with the Vbusdiv-input-signal.

In one or more embodiments the AC-impedance-network comprises:
- a capacitor and a third-impedance connected in series between the Vbusdiv-output-terminal and either (i) the Vbus-input-terminal (which can apply over-compensation) or (ii) the reference terminal (which can apply under-compensation).

In one or more embodiments the third-impedance is configured to contribute to the AC transfer function, but not the DC transfer function.

In one or more embodiments the AC-impedance-network further comprises a fourth-impedance. An additional-divider-node may be defined between the third-impedance and the capacitor that are connected in series. The fourth-impedance may be connected between the additional-divider-node and either (i) the reference terminal or (ii) the Vbus-input-terminal In one or more embodiments the fourth-impedance is in parallel with either (i) a series arrangement of the capacitor and a second-impedance or (ii) a series arrangement of the capacitor and a first-impedance.

In one or more embodiments the AC-impedance-network further comprises a first-impedance connected between the Vbus-input-terminal and the Vbusdiv-output-terminal. The AC-impedance-network may further comprise a second-impedance connected between the Vbusdiv-output-terminal and the reference-terminal.

In one or more embodiments the DC-impedance-network comprises:
- the first-impedance; and
- not the third-impedance of the AC-impedance-network.

In one or more embodiments the DC-impedance-network comprises the second-impedance.

In one or more embodiments the bus-voltage-signal comprises a DC component and an AC component. The DC-impedance-network may be configured to apply a DC transfer function to the DC component of the received bus voltage signal. The AC-impedance-network may be configured to apply an AC transfer function to the AC component of the received bus voltage signal.

In one or more embodiments the Vbus-compensation-network is configured to apply an external compensation factor to the bus-voltage-signal when generating the Vbusdiv-input-signal.

In one or more embodiments the controller further comprises:
- a control-input terminal configured to receive a control-input-signal; and
- a control-output-terminal configured to provide a control-output-signal for controlling the resonant converter.

The controller may be configured to determine the control-output-signal based on the Vbusdiv-input-signal and the control-input-signal.

In one or more embodiments the control-output-signal is configured to control a state variable of the resonant converter. The state variable may comprise one or more of:
- primary current; and
- voltage across a resonant capacitor.

In one or more embodiments the control-output-signal is configured to control a frequency of operation of the resonant converter.

In one or more embodiments the controller is configured to apply an internal compensation factor to the Vbusdiv-input-signal in order to determine the control-output-signal.

There may be provided a resonant converter circuit comprising:
- a controller having a Vbusdiv-input-terminal configured to receive a Vbusdiv-input-signal;
- a Vbus-compensation-network comprising:
  - a Vbus-input-terminal configured to receive a bus-voltage-signal;
  - a Vbusdiv-output-terminal configured to provide the Vbusdiv-input-signal to the controller;
  - a reference-terminal;
  - a first-impedance;
  - a second-impedance;
  - a third-impedance; and
  - a capacitor;
  wherein:
  - the first-impedance is connected between the Vbus-input-terminal and the Vbusdiv-output-terminal;
  - the second-impedance is connected between the Vbusdiv-output-terminal and the reference-terminal; and
  - the third-impedance and the capacitor are connected in series with each other between the Vbusdiv-output-terminal and either (i) the Vbus-input-terminal or (ii) the reference terminal, such that the third-impedance and the capacitor are in parallel with either (i) the first-impedance or (ii) the second-impedance;
  wherein the controller is configured to control operation of a resonant converter in accordance with the Vbusdiv-input-signal.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future claim sets. The Figures and Detailed Description that follow also exemplify various example embodiments. Various example embodiments may be more completely understood in consideration of the following Detailed Description in connection with the accompanying Drawings.

BRIEF DESCRIPTION OF DRAWINGS

One or more embodiments will now be described by way of example only with reference to the accompanying drawings in which.

Example embodiments disclosed herein relate to resonant power converters, and in some examples to resonant converters controlled by resonant tank variables including the voltage across a resonant capacitor, or a signal derived from voltage across the resonant capacitor.

Resonant LLC topology can be well-suited for high-power applications, for example applications that require powers larger than approximately 100 Watts full load. This is because a resonant LLC topology can provide high efficiency, small volumes and high power density. However, one of the main disadvantages for resonant LLC topology is its relatively low efficiency under low load conditions (for example when operated with a 50% duty cycle). Losses in this mode of operation may be a multiple of the required standby power.

Figure 1:
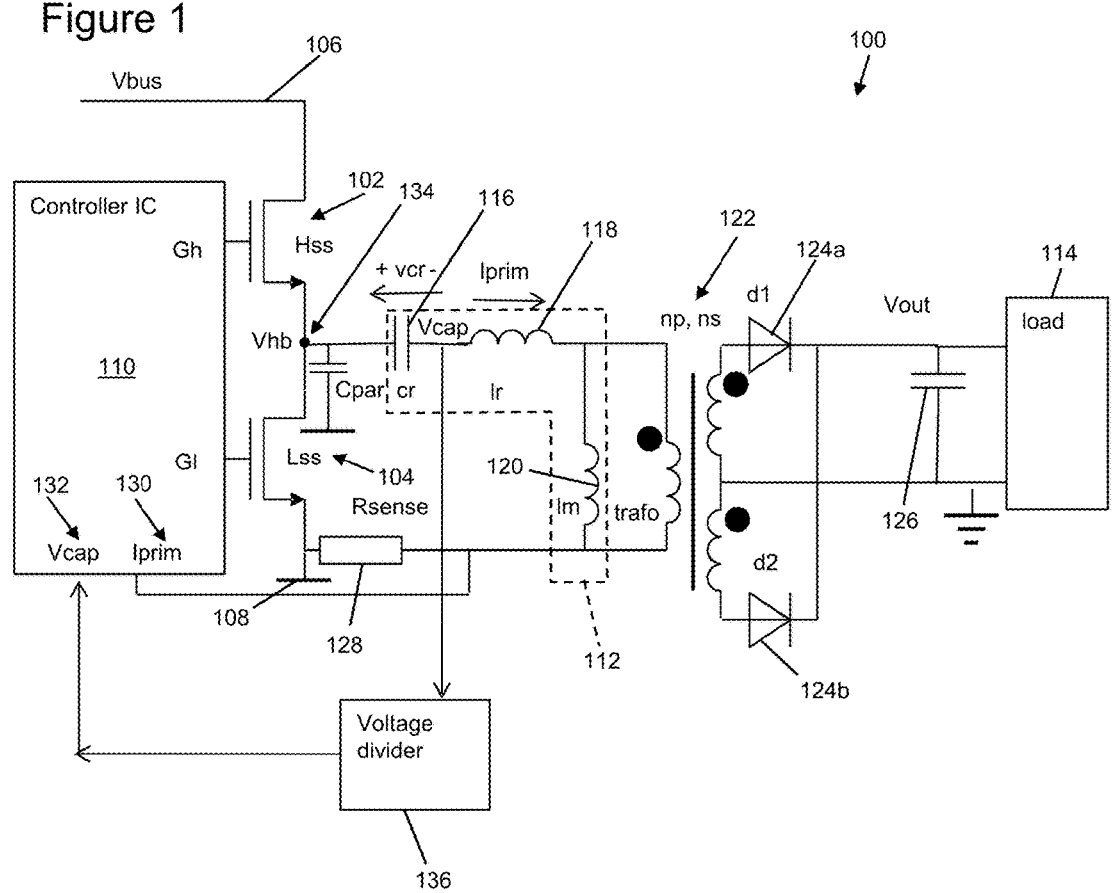
FIG. 1 shows an example of an LLC resonant converter.

FIG. 1 shows an example of an LLC resonant converter 100.

The LLC resonant converter 100 has a half bridge structure; which comprises a high-side-switch Hss 102 and a low-side-switch Lss 104 connected in series with each other between a voltage-bus-source $V_{bus}$ 106 and a reference terminal; which in this example is ground 108. Anode between the series connection of the high-side-switch Hss 102 and the low-side-switch Lss 104 will be referred to as a half-bridge-node 134, which has a half-bridge-voltage Vhb.

The LLC resonant converter 100 also includes a transformer 122 having a primary winding and a tapped secondary winding. The tapped secondary winding is connected to two rectifier diodes 124a, 124b and a filter capacitor 126, which in turn are connected to a load 114.

The LLC resonant converter 100 has a resonant tank 112; which includes a resonant-capacitor Cr 116, a resonant-inductor Lr 118, and a magnetizing-inductor Lm 120. The resonant-capacitor Cr 116, the resonant-inductor Lr 118, and the magnetizing-inductor Lm 120 are connected in series between half-bridge-node 134 and a first terminal of a sense-resistor 128. A second terminal of the sense-resistor 128 is connected to ground 108.

In the example of FIG. 1, the resonant-capacitor Cr 116 and the resonant-inductor Lr 118 are connected in series between the half-bridge-node 134 and a first terminal of the primary winding of the transformer 122. The magnetizing-inductor Lm 120 is connected in parallel with the primary winding. A second terminal of the primary winding is connected to a first terminal of the sense-resistor 128.

The LLC resonant converter 100 has a controller 110 that provides control-output-signals to the high-side-switch Hss 102 and the low-side-switch Lss 104 in order to control when energy is put into the resonant tank 112 from the voltage-bus-source Vbus 106, and when energy is taken out of the resonant tank 112 for the load 114.

The controller 110 of FIG. 1 has two control-input-terminals: a primary-current-input-terminal 130 that receives a primary-current-signal representative of a primary current (Iprim) flowing through the resonant converter 100; and a primary-voltage-input-terminal 132 that receives a primary-voltage-signal representative of a voltage (Vcap) across the primary winding of the transformer 122. The controller 110 determines the control-output-signals for the high-side-switch Hss 102 and the low-side-switch Lss 104 based on the primary-current-signal and the primary-voltage-signal, in order to control the switching of the LLC resonant converter 100.

The primary current (Iprim) and the voltage (Vcap) across the primary winding are examples of state variables of the LLC resonant converter 100. Use of state variables (such as primary current, voltage across the resonant capacitor) to control the converter can provide the following advantages:

The converter can be more efficient at part-load because the timing required for following of a power efficient trajectory can be better reached using state variables compared to frequency control.

The transfer from control variable to output current can be frequency independent, and can allow for a constant gain of the transfer. This can allow for a fast loop to be used that minimizes reduces any overshot when there is a loadstep.

In this example, the LLC resonant converter 100 includes an optional voltage divider 136 that divides the voltage across the resonant capacitor (Vcap) by a value such that the resultant voltage level of Vcap-divided is at a sufficiently low level for it to be handled by the controller 110. That is, the primary-voltage-signal can be representative of a proportion of the voltage (Vcap) across the primary winding of the transformer 122.

Figure 2:
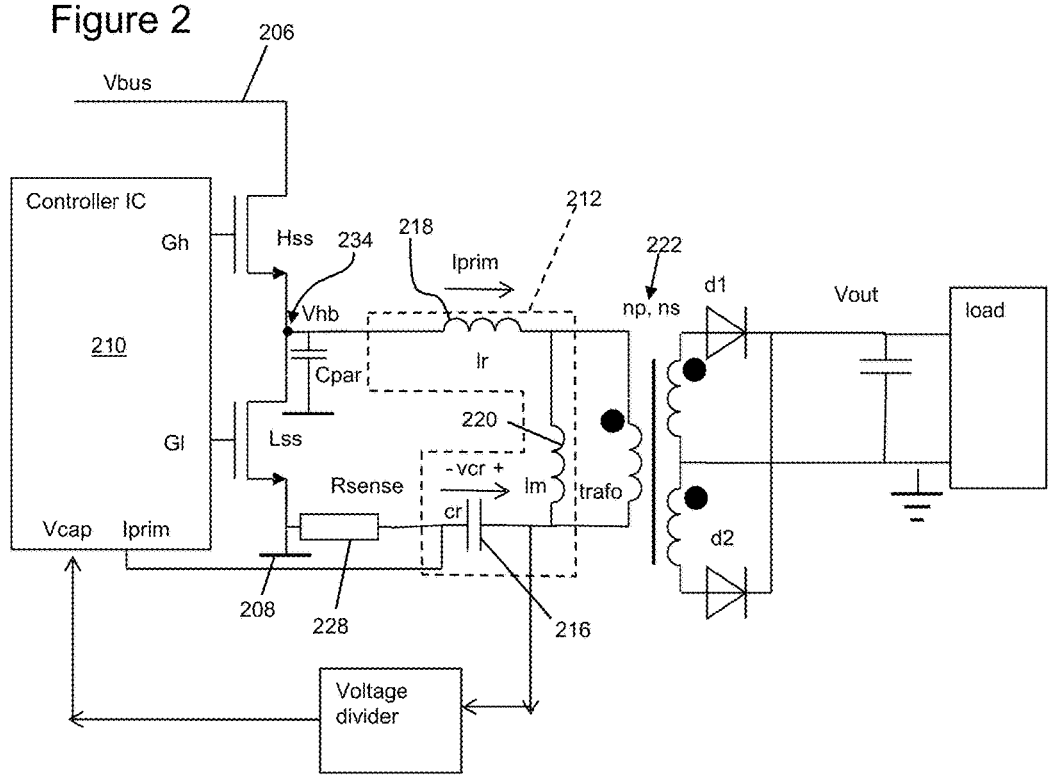
FIG. 2 shows another example of an LLC resonant converter.

FIG. 2 shows another example of an LLC resonant converter 200. Features of FIG. 2 that have already been described with reference to FIG. 1 will not necessarily be described again here.

In FIG. 2, the resonant-capacitor Cr 216 is placed at the ground/reference side of the transformer 222. That is, the resonant-inductor Lr 218 is connected in series between the half-bridge-node 234 and a first terminal of the primary winding of the transformer 222. The magnetizing-inductor Lm 220 is connected in parallel with the primary winding. The resonant-capacitor Cr 216 and the sense-resistor 228 are connected in series between a second terminal of the primary winding and the reference terminal 208. Placing the resonant-capacitor Cr 216 at the ground/reference side of the transformer 222 can be advantageous because the resonant-capacitor 216 can now be split up between the reference terminal 208 and the voltage-bus-source Vbus 206. That is, a first-resonant-capacitor and a second-resonant-capacitor can be used instead of the resonant-capacitor Cr 216 shown in FIG. 2. For example, the first-resonant-capacitor, having half the capacitance value of the resonant-capacitor Cr 216 shown in FIG. 2, can be connected in series with the sense-resistor 228 between a second terminal of the primary winding and the reference terminal 208. The second-resonant-capacitor (not shown in FIG. 2), also having half the capacitance value of the resonant-capacitor Cr 216 shown in FIG. 2, can be connected between Vbus 206 and the node between the magnetizing-inductor Lm 220 and the first-resonant-capacitor 216. Therefore, the second-resonant-capacitor is not directly connected to the reference terminal 208, and therefore can provide a lower ripple current in a buffer capacitor (not shown) that may be connected to the voltage-bus-source Vbus 206.

As indicated above, in FIG. 2 the resonant-capacitor 216 is in series with the sense-resistor 228, which is used to sense the primary current and provide the primary-current-signal to the controller 210. Strictly speaking, the sensed voltage across the resonant-capacitor 216 therefore also includes the voltage across the sense-resistor 228 acting as a current sensing component. However, as the voltage across the resonant-capacitor 216 may be a few 100 volts, while the voltage across the sense-resistor 228 is 30 times lower in amplitude, the accuracy of this method of sensing can be considered acceptable.

Figure 3:
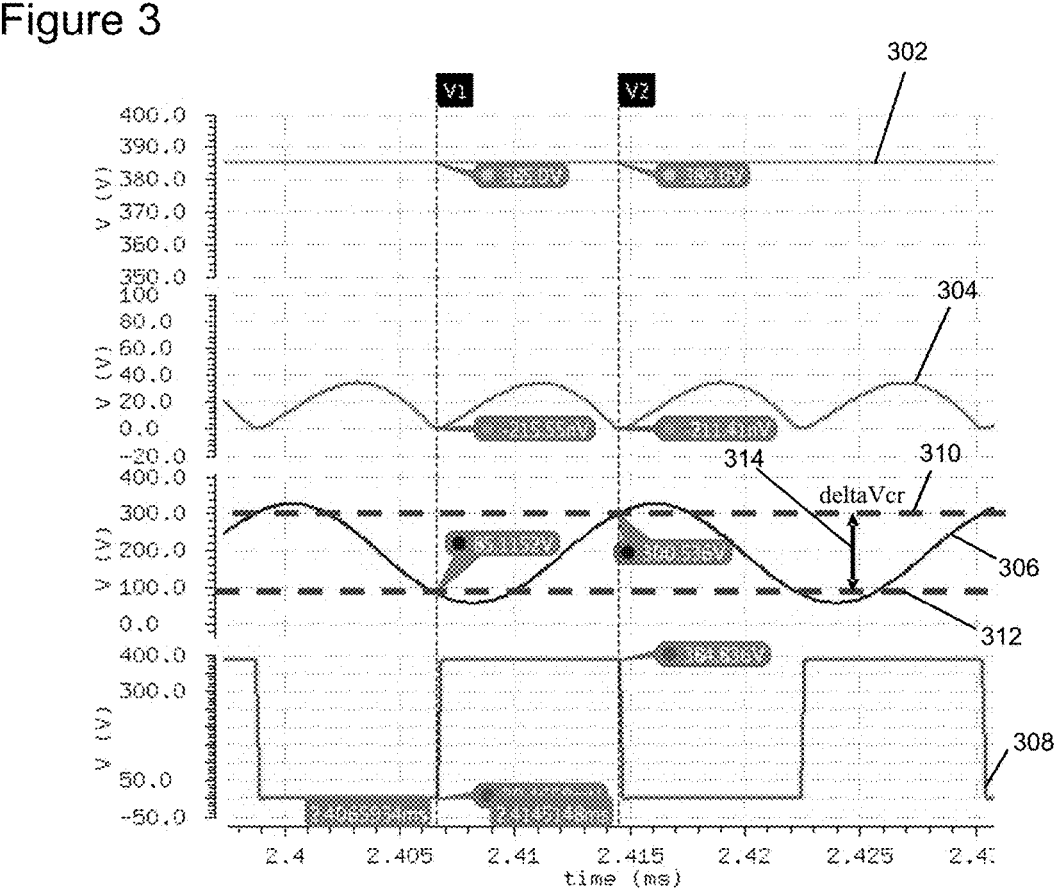
FIG. 3 shows plots of signals in an LLC resonant converter circuit.

FIG. 3 shows four plots of signals in an LLC resonant converter circuit, for which the output power level of the LLC resonant converter is controlled by terminating a conduction interval for each half-cycle when the voltage across the resonant-capacitor (Vcr) or a voltage derived from Vcr (such as Vcap, which equals Vhb-Vcr) reaches a high-threshold-value or a low-threshold-value.

FIG. 3 shows the following plots:
A first plot (Vbus) 302 that shows the voltage level of the voltage-bus-source Vbus, which in this example is 385V.
A second plot 304 (iout) that shows the output current of the LLC resonant converter.
A third plot 306 (vcr) that shows the voltage across the resonant-capacitor.
A fourth plot 308 (vhb) that shows the half-bridge-voltage at the half-bridge-node. The half-bridge-voltage switches between a high level and a low level when the states of the high-side-switch Hss and the low-side-switch Lss are changed.

The third plot also shows a high-threshold-value 310 and a low-threshold-value 312. The high-threshold-value 310 in this example is about 300V, and the low-threshold-value 312 is about 85V. The difference between the high-threshold-value 310 and the low-threshold-value 312 will be referred to as deltaVcr 314.

When the half-bridge-voltage (vhb) 306 reaches the high-threshold-value 310, the controller operates the high-side-switch Hss such that it is changed from closed to open, and also operates the low-side-switch Lss such that it is changed from open to closed. The switches are maintained in this state for a half-cycle of operation until the half-bridge-voltage (vhb) 306 reaches the low-threshold-value 312.

When the half-bridge-voltage (vhb) 306 reaches the low-threshold-value 312, the controller operates the high-side-switch Hss such that it is changed from open to closed, and also operates the low-side-switch Lss such that it is changed from closed to open. The switches are maintained in this state for a half-cycle of operation until the half-bridge-voltage (vhb) 306 reaches the high-threshold-value 310.

This way of power control gives a good relationship between power and voltage difference (deltaVcr) between 2 half-cycles:

$$Power = deltaVcr \times Cr \times Vbus \times Fswitch = Vout \times Iout$$

Where:
deltaVcr 314 is the difference between the levels of vcr 306 at the end of 2 half-cycles,
Cr is the resonant capacitor value,
Vbus is the input voltage for the LLC,
Fswitch is the operating frequency of the high-side-switch and the low-side-switch, and
Vout and Iout are the output voltage and current of the power supply.

From the power equation it can be concluded that for a given deltaVcr, the output power still depends on Vbus and Fswitch. This holds for the resonant converter being controlled by deltaVcr. Also, in examples where the resonant converter is controlled by setting the frequency of operation (the frequency of the half-cycles), the output power is also a function of switching frequency and busvoltage, where the busvoltage has an even greater impact on the delivered output power.

Two important reasons for compensating the influence of Vbus variations are:
1. A variation of bus voltage gives an undesired variation in output power. This variation can be reduced by the feedback loop that compares Vout of the supply with a reference and sets the deltaVcr as result, such that the delivered power equals the power drawn by the load. However, the limited bandwidth of the feedback loop can cause the loop gain at the frequency of the Vbus variations (which may be 100 or 120 Hz) also to be limited. This can result in a residual ripple in the voltage at the output of the resonant converter (Vout) because the power variation due to Vbus ripple cannot be fully suppressed.
2. Some systems that use deltaVcr to control the output power in accordance with the above power equation, also use deltaVcr to change over to a different mode of operation (for example between a high power mode and a low power mode) at a certain power level. This is based on an assumption that there is a well-defined relationship between deltaVcr and output power. At a given level of deltaVcr for change over to a different mode of operation. Vbus variations and frequency variations can therefore cause a different power to occur at the changeover level. In practice, this can result in a risk of undesired repetitive jumping between both modes of operation with a 100 or 120 Hz repetition rate. One option for reducing the risk of such repetitive jumping is to use hysteresis at the mode changeover. However, such hysteresis may not be desirable in some applications because the mode changeover may be set according to optimum efficiency in each mode. Therefore, when using hysteresis, it may then not be possible to set the mode changeover at a desired power level.

By applying a Vbus compensation that adapts deltaVcr according to 1/Vbus, one or more of the negative effects of the Vbus term in the power equation can be reduced or eliminated. Such Vbus compensation is illustrated as a first internal compensation curve in FIG. 9, and will be described below. However, the frequency variation according to a Vbus variation can be still considerable. Depending on the resonant tank values, a variation of Vbus of 10% can cause a change in frequency of up to 10-25%. Without compensation for that, the level of variation in the output power can be unacceptably high.

It is possible to apply Vbus voltage overcompensation, by adapting the deltaVcr term in accordance with more than just 1/Vbus. However, as the required compensation depends on the resonant tank, if such an overcompensation is fixed, then it can lead to inadequate/wrong compensation for different resonant tank designs. An external setting can then be used, which can be selected based on the resonant tank chosen in order to achieve optimum (or at least acceptable) overcompensation. Such an external setting may require an additional pin on the controller IC, which may not be available or desirable. As will be discussed below with reference to FIGS. 5a, 5b and 6, one or more example embodiments disclosed herein can advantageously utilise an existing Vbusdiv input pin on the controller IC to also receive an external compensation factor.

Figure 4:
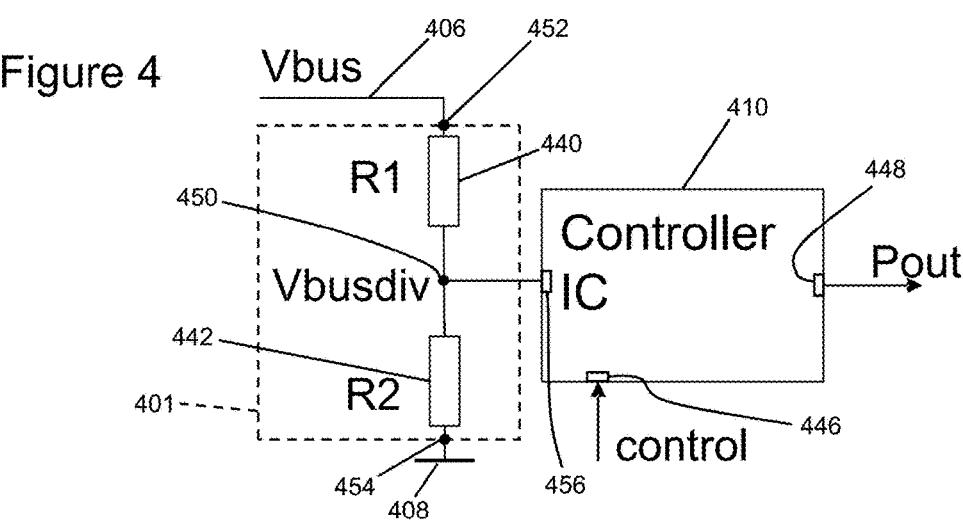
FIG. 4 shows a Vbus-compensation-network and a controller.

FIG. 4 shows a Vbus-compensation-network 401 that can be used with a controller 410. The controller 410 can be used with a resonant converter such as the ones illustrated in FIGS. 1 and 2.

The controller 410 in this example also includes a control-input terminal 446 for receiving one or more control-input-signals, and a control-output-terminal 448 for providing a control-output-signal for controlling one or more properties of a resonant converter. The controller 410 also has a Vbusdiv-input-terminal 456 for receiving a Vbusdiv-input-signal, as will be discussed below.

The controller 410 can determine the control-output-signal based on the Vbusdiv-input-signal and the control-input-signal. The controller 410 control the switches of the resonant converter in accordance with the Vbusdiv-input-signal inasmuch as it can use the Vbusdiv-input-signal in the power equation to not an operating parameter of either deltaVcr or Fswitch. In this way, the controller can make the deltaVcr value proportional to the control input minus a reference, and can multiply this by a compensation factor=F (Vbusdiv). As will be discussed below with reference to FIG. 9, a first internal compensation curve can be used by the controller to apply a compensation factor that compensates only the Vbus factor (1/Vbusdiv). Alternatively, a second internal compensation curve can be used by the controller to apply a compensation factor that also compensates for Fswitch dependency The control input-signal can be representative of the desired power to be delivered. The control-output-signal can control the value of the state variables at the switching moments such as deltaVcr with reference to FIG. 3 or primary current of the resonant converter, for example.

The Vbus-compensation-network 401 includes a Vbus-input-terminal 452, a Vbusdiv-output-terminal 450, and a reference terminal 454. The Vbus-input-terminal 452 is connected to a voltage-bus-source Vbus 406 in order to receive a bus-voltage-signal, and the reference terminal 454 is connected to ground 408. The Vbusdiv-output-terminal 450 of the Vbus-compensation-network 401 is connected to the Vbusdiv-input-terminal 456 of the controller 410.

The Vbus-compensation-network 401 also includes a first resistor R1 440 and a second resistor R2 442 connected in series between the Vbus-input-terminal 452 and the reference terminal 454, in order to provide a resistive divider. The resistive divider of the Vbus-compensation-network 401 divides the sensed bus voltage (Vbus) to a lower level that is suitable for processing by the controller 410. This level may be referred to as 'Vbusdiv' and may, for example, be about 2.5V. The connection/node between the first resistor R1 440 and the second resistor R2 442 can be considered as the Vbusdiv-output-terminal 450 that provides the Vbusdiv-input-signal to the controller 410.

The controller 410 can use a compensation principle that determines a variation in Vbusdiv, and adapts the control of the resonant converter such that the amount of energy that is transferred to the output of the resonant converter provides a desired output power level (Pout). Considering the small signal gain of the Vbus-compensation-network 401 from the Vbus-input-terminal 452 to the Vbusdiv-output-terminal 450, it can easily be concluded that for FIG. 4:

$$dVbusdiv/dVbus=R2/(R1+R2).$$

The controller 410 can be said to apply internal/fixed compensation, because the processing is internal to the controller 410, which may be provided on an IC.

In some examples, the voltage-bus-source 406 can be provided by a power factor correction (PFC) circuit (not shown), which itself requires control to provide Vbus at the desired voltage level. The controller 410 can therefore process the received Vbusdiv signal, and determine control signals for the PFC such that its output voltage tends towards the desired level of Vbus. This is one example implementation of internal compensation.

Figure 5A:
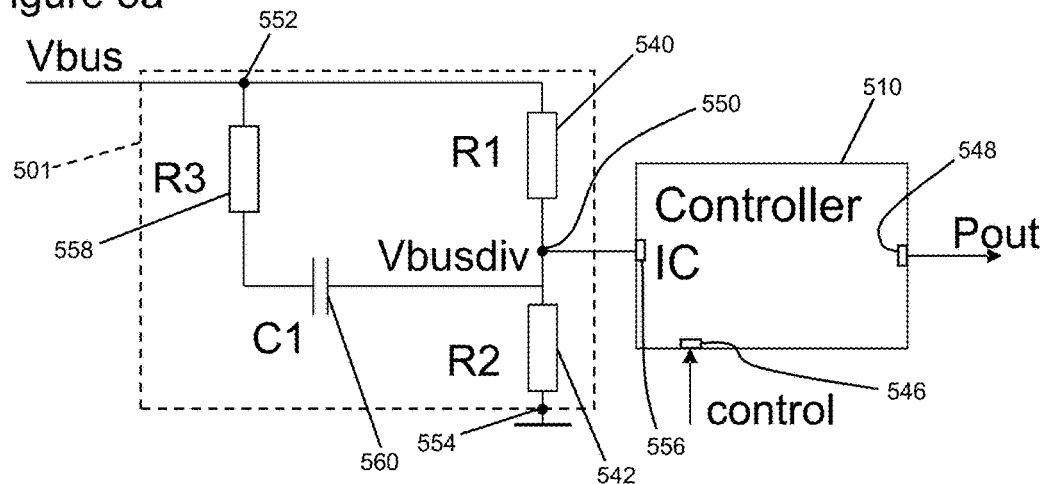
FIGS. 5a and 5b show example embodiments of a resonant converter circuit that include a Vbus-compensation-network and a controller.

FIG. 5a shows an example embodiment of a resonant converter circuit that includes a Vbus-compensation-network 501 and a controller 510. The Vbus-compensation-network 501 of FIG. 5a uses an addition to the configuration of FIG. 4, in order to increase the value of an AC component of dVbusdiv/dVbus such that the circuit can better accommodate variations in the value of voltage-bus-source Vbus 506.

As with FIG. 4, the controller 510 of FIG. 5a includes a Vbusdiv-input-terminal 556 that can receive a Vbusdiv-input-signal from the Vbus-compensation-network 501. The Vbus-compensation-network 501 has a Vbus-input-terminal 552, a Vbusdiv-output-terminal 550 and a reference-terminal 554.

The Vbus-compensation-network 501 includes a first-resistor 540 (which is an example of a first-impedance) and a second-resistor 542 (which is an example of a second-impedance). The first-resistor 540 is connected between the Vbus-input-terminal 552 and the Vbusdiv-output-terminal 550. The second-resistor 542 is connected between the Vbusdiv-output-terminal 550 and the reference-terminal 554. In this way, the first-resistor 540 and the second-resistor 542 provide a voltage divider in the same way as FIG. 4.

The Vbus-compensation-network 501 also includes a third-resistor 558 (which is an example of a third-impedance) and a capacitor 560. The third-resistor 558 and the capacitor 560 are connected in series with each other between the Vbusdiv-output-terminal 550 and the Vbus-input-terminal 552. In this way, the third-resistor 558 and the capacitor 560 are in parallel with the first-resistor 540.

Each of the resistors disclosed herein may be linear or non-linear resistors.

The capacitance of the capacitor 560 can be chosen to be sufficiently large so that its impedance can be neglected when compared to that of the third-resistor 558. This gives an increased transfer for AC signals, for example in the frequency range of 10-120 Hz:

$$dVbusdiv/dVbus=R2/((R1//R3)+R2).$$

In this way, the capacitor 560, the first-resistor 540, the second-resistor 542 and the third-resistor 558 can be considered as an example of an AC-impedance-network that is connected between the Vbus-input-terminal 552 and the Vbusdiv-output-terminal 550. As discussed above, the AC-impedance-network is configured to apply an AC transfer function to the received bus voltage signal.

However, due to the capacitor 560 in the Vbus-compensation-network 501, which represents an open circuit at DC, the DC transfer function of the Vbus-compensation-network 501 is the same as that of FIG. 4:

$$R2/(R1+R2).$$

In this way, the first-resistor 540 and the second-resistor 542 can be considered as an example of a DC-impedance-network that is connected between the Vbus-input-terminal 552 and the Vbusdiv-output-terminal 550. As discussed above, the DC-impedance-network is configured to apply a DC transfer function to the received bus voltage signal. Due to the presence of the capacitor 560 in this example, the DC transfer function is different to the AC transfer function. In the circuit of FIG. 5a, the third-resistor 558 contributes to the AC transfer function, but not the DC transfer function. That is, the third-resistor 558 is not part of the DC-impedance-network in this example.

Maintaining such a DC transfer function can be especially beneficial for examples in which Vbus is provided by a PFC, and a power factor correction part of the controller 410 is used to regulate the DC term of Vbus to the desired value.

Therefore, when the bus-voltage-signal comprises a DC component and an AC component, the Vbus-compensation-network can (i) apply a DC transfer function to the DC component of the received bus-voltage-signal, and (ii) apply an AC transfer function to the AC component of the received bus-voltage-signal, in order to provide the Vbusdiv-input-signal. As indicated above, the DC transfer function is different to the AC transfer function. In this example, the third-resistor 558 contributes to the AC transfer function, but not the DC transfer function.

A compensation factor can be applied by the Vbus-compensation-network 501. This may be referred to as providing external compensation, and can be defined relative to the Vbus-compensation-network of FIG. 4 that does not have the third-resistor 558 and the capacitor 560. The compensation factor can be defined as:

$$Fc=dVbusdiv/dVbus \text{ for FIG. } 5a/dVbusdiv/dVbus \text{ for FIG. } 4(R2/(R1+R2))/(R2/((R1//R3)+R2))=(R1+R2)/((R1//R3)+R2)$$

By proper choice of the third-resistor 558, a well-defined overcompensation factor can be selected. For example if the resistance of the third-resistor 558 equals 10 times the resistance of the first-resistor 540, this results in about 10% overcompensation (R1/R3=10/11*R1=0.91 R1)—that is, a compensation factor of 1:1.

In another example (not shown), the third-resistor 558 and the capacitor 560 can be connected in series with each between the Vbusdiv-output-terminal 550 and the reference terminal 554. In this way, the third-resistor 558 and the capacitor 50 are in parallel with the second-resistor 542 instead of the first-resistor 540. It will be appreciated from the above equations, that use of such a Vbus-compensation-network 501 would implement a compensation factor (Fc) that is less than 1, to provide under-compensation, which may be desirable in some examples.

The example embodiment of FIG. 5a can advantageously reduce the effect of bus voltage lei variation on output power and/or reduce the likelihood of repetitive jumping between different modes of operation by applying an external over-compensation without the need for an additional pin. The reduced effect of bus voltage variation on output power will be further discussed with reference to FIG. 9.

Figure 5B:
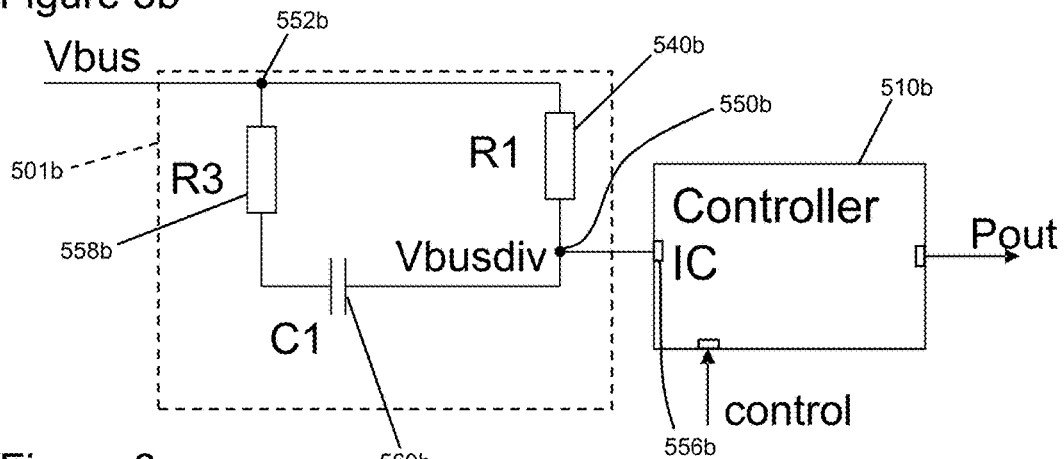

FIG. 5b shows an example embodiment of a resonant converter circuit that includes a Vbus-compensation-network 501b and a controller 510b. Features of FIG. 5b that have already been described with reference to FIG. 5a will not necessarily be described again here.

The Vbus-compensation-network 501b does not include the second-resistor that is shown in FIG. 5a. That is, the Vbus-compensation-network 501b includes:

a first-resistor 540b connected between the Vbus-input-terminal 552b and the Vbusdiv-output-terminal 550b: and a third-resistor 558b and a capacitor 560b are connected in series with each other between the Vbusdiv-output-terminal 550b and the Vbus-input-terminal 552b In the example of FIG. 5b, the functionality of the second-resistor of FIG. 5a could be implemented by the controller 510b. For example the Vbusdiv-input-terminal 556b of the controller 510b may be a virtual ground. In this way, the controller 510b can sense current instead of voltage and compare the sensed current with a reference current Vref/R2.

In this example, the first-resistor 540b can be considered as the DC-impedance-network, and the network of the series combination of the third-resistor 558b and the capacitor 560b, in parallel with the first-resistor 540b, can be considered as the AC-impedance-network.

Figure 6:
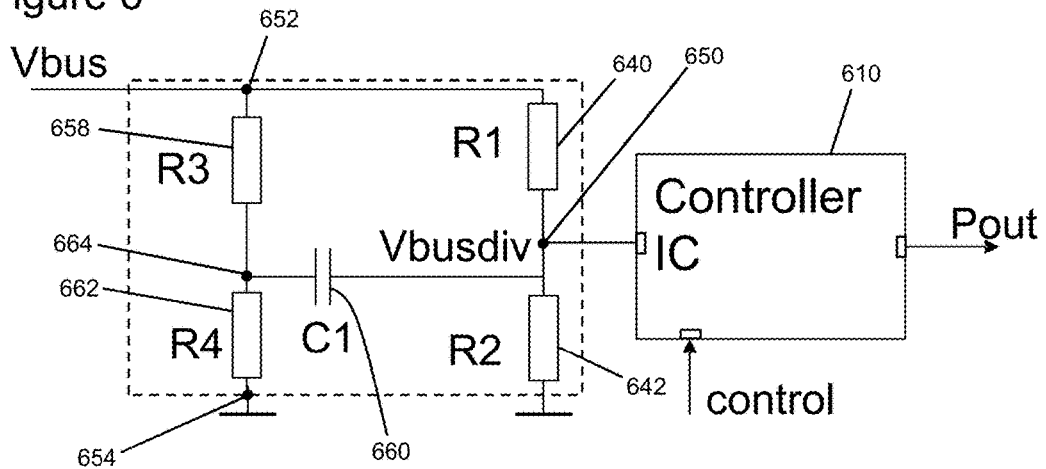
FIG. 6 shows another example embodiment of another resonant converter circuit that includes a Vbus-compensation-network and a controller.

FIG. 6 shows another example embodiment of another resonant converter circuit that includes a Vbus-compensation-network 601 and a controller 610. Components of FIG. 6 that have already been described with reference to FIG. 5a will not necessarily be described again here.

The Vbus-compensation-network 601 also includes a fourth-resistor 662 (which is an example of a fourth-impedance). In this example, the connection between the third-resistor 658 and the capacitor 660 (that are connected in series with each other) is labelled as an additional-divider-node 664. The fourth-resistor 662 is connected between the additional-divider-node 664 and the reference terminal 654. In this way, the fourth-resistor 662 is in parallel with a series arrangement of the capacitor 660 and the second-resistor 642.

Use of the fourth-resistor 662, to provide an additional resistive divider with the third-resistor 658, advantageously can enable a lower, more practical value to be used for the third-resistor 658.

In an example (not shown) where the third-resistor 658 is connected to the reference terminal 654 instead of the Vbus-input-terminal 652, the fourth-resistor 662 is connected between the additional-divider-node 664 and the Vbus-input-terminal 652. In this way, the fourth-resistor 662 is in parallel with a series arrangement of the capacitor 660 and the first-resistor 640.

The circuits of FIGS. 5a, 5b and 6 can apply external overcompensation by re-using the resistive divider that is used for fixed internal Vbus compensation. In FIG. 6, this external overcompensation can apply for an additional resistive divider being AC coupled in parallel with the divider for sensing the bus voltage. The parallel path can allow for overcompensation with a compensation factor that can be externally set (externally of the controller through use of components with appropriate resistance and capacitance values).

Figure 7A:
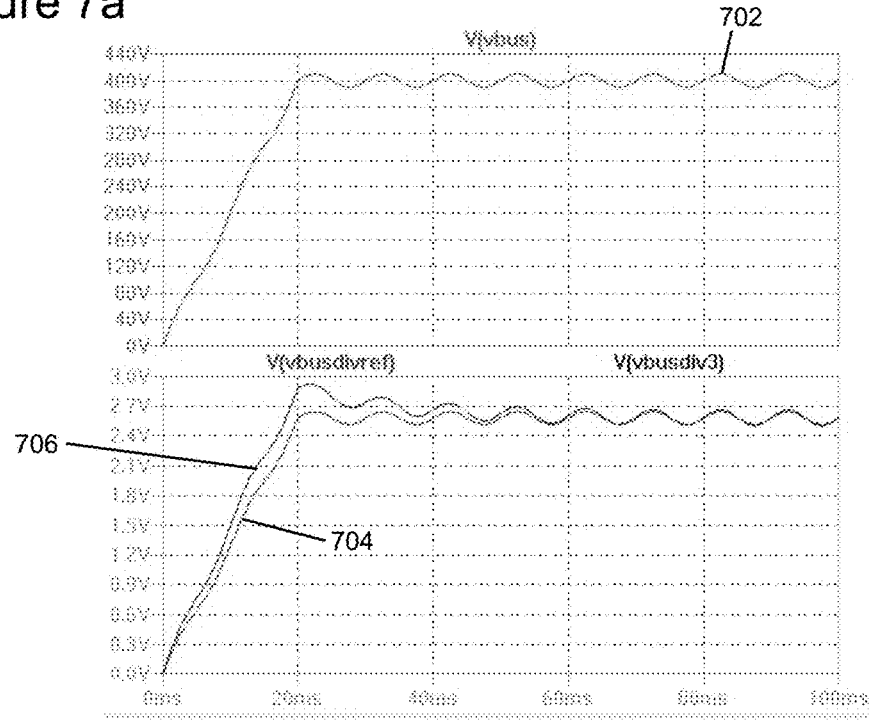
FIGS. 7a and 7b show a simulation result for the example embodiment of FIG. 6.
Figure 7B:
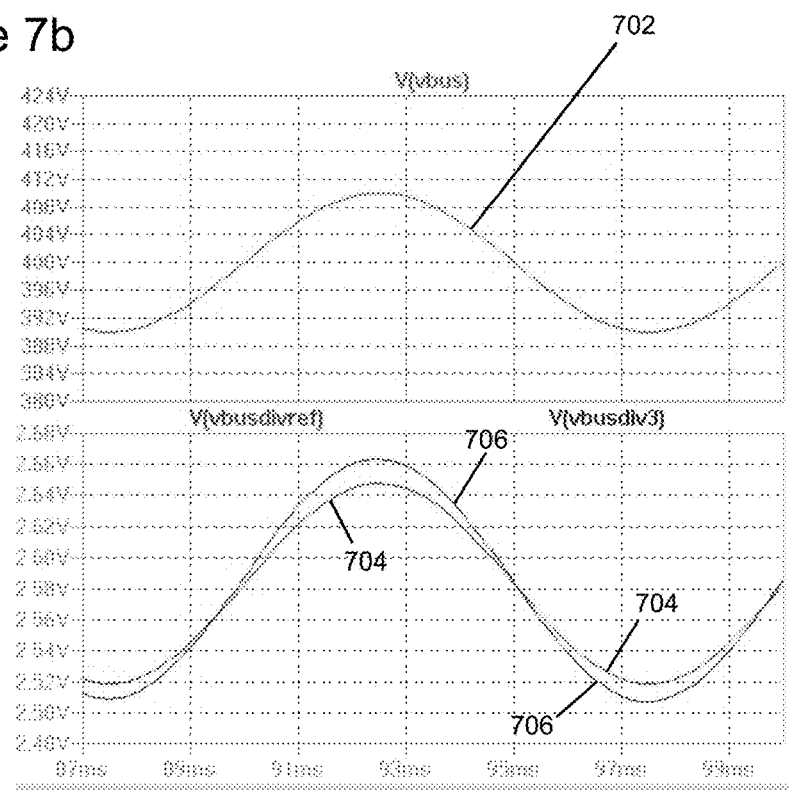

FIGS. 7a and 7b show a simulation result for the example embodiment of FIG. 6.

In a first plot of FIG. 7a, the voltage level of the voltage-bus-source Vbus 702 is shown as it ramps up during start-up of the power supply from 0V to about 400V. A first plot of FIG. 7b shows a zoomed-in view of ringing in Vbus 702, between 87 ms and 100 ms, once Vbus 702 has settled following the ramp up. In this simulation example. Vbus 702 is externally applied as voltage source, but in a practical application Vbus 702 can be the result of a feedback loop behaviour.

In a second plot of FIG. 7a, the voltage level of Vbusdivref 704 is shown over the same timeframe as the first plot. Vbusdivref 704 is shown as a reference signal, and is a divided version of Vbus 702, for example as generated by the circuit of FIG. 4 that has only a single resistive divider. The second plot of FIG. 7a also shows the voltage level of Vbusdiv 706, which is provided at the Vbusdiv-output-terminal of the Vbus-compensation-network of FIG. 6. FIG. 7a shows that Vbusdiv 706 overshoots Vbusdivref 704 during the transition from 0V, which is undesired. However, this disadvantage can be considered minor because it only occurs for a short time, and only when Vbus 702 transitions from 0V to its final value (in this example 400V). As discussed below with reference to FIG. 7b, lei this minor disadvantage can be considered to be outweighed by the advantages that exist once Vbus 702 has settled around its final value.

In a second plot of FIG. 7b, it can be seen that the amplitude of the ringing in Vbusdiv 706 is greater than the amplitude of the ringing in Vbusdivref 704. This is due to the additional part in parallel with the first resistive divider (provided by the first-resistor and the second-resistor), and in this example represents about a 10% increase in the transfer from Vbus 702 to vbusdiv 704.

As indicated above, Vbusdiv 706 is larger than Vbusdivref 704 during the ramp-up in Vbus 702. This can mean that, in examples that use a PFC to generate Vbus 702, the feedback loop for the PFC controller may initially regulate Vbus 702 to a lower voltage during ramp-up, thereby more slowly reaching its nominal value. For this reason, it can be advantageous to use the Vbus-compensation-network of FIG. 5, 5a or 6 together with a fixed internal Vbus compensation such that the external compensation can be chosen not larger than necessary in order to limit this effect. The combination of internal Vbus compensation and external additional compensation will be discussed with reference to FIGS. 8 and 9.

Figure 8:
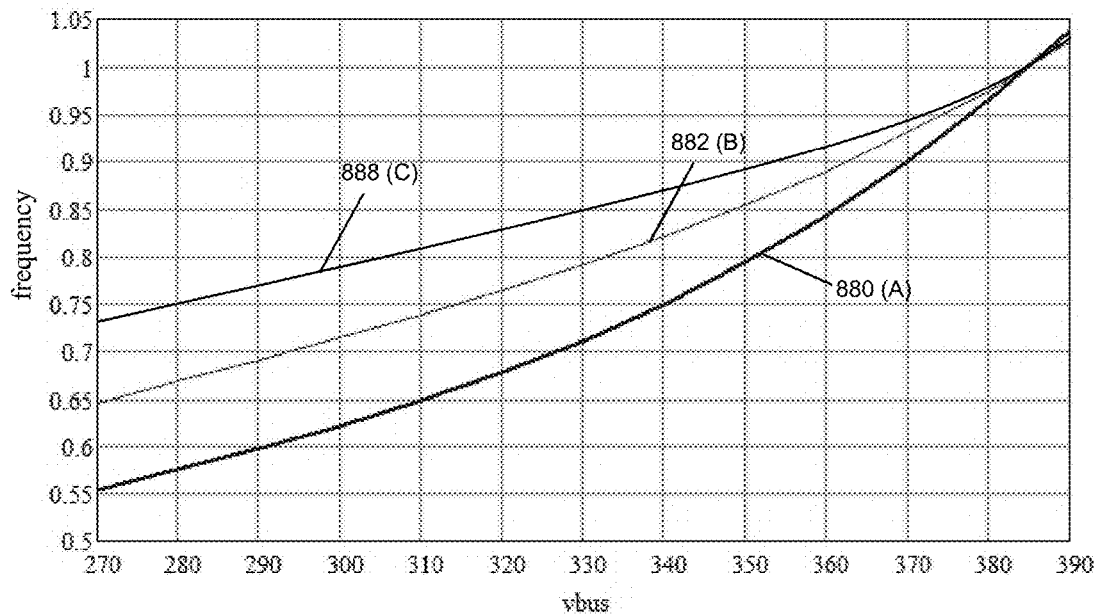
FIG. 8 shows a graph that represents the performance of two different resonant converter designs.

FIG. 8 shows a graph of 3 different resonant converter design—Design A 880, Design B 882 and Design C 888, where switching frequency (Fswitch) of the resonant converter is plotted against Vbus for a fixed output power level. Frequency, normalised with reference to the switching frequency when Vbus is 385V, is shown on the vertical axis. Vbus is shown on the horizontal axis. FIG. 8 shows that, for each design, in practice, the relationship between Fswitch and Vbus at constant power is such that if Vbus decreases, also Fswitch decreases, making power reduce even more. In order to maintain a constant power, therefore, we have to increase deltaVcr in a way that is more than proportional. So, for the example of Design A 880, starting at 385V and relative frequency=1 lets say that we have an output power of 100 watt. Then if Vbus reduces to 340V (Vbusdiv=340/385×2.5=2.2), the switching frequency drops to 75%, which results in a power drop to approximately 65 watt. In order to maintain an output power of 100 watt, deltaVcr can be adapted. As discussed below with reference to the optimum compensation curve for Design A of FIG. 9, deltaVcr can be increased by a factor of 1.51 (385/340×1/075).

According to the power equation:

$$\text{Power} = \text{delta}V_{cr} \times C_r \times V_{bus} \times F_{switch} = V_{out} \times I_{out}$$

an optimum/acceptably good compensation can be defined such that the power s only a function of deltaVcr. That is, a variation in Fswitch as a function of Vbus (that is Fswitch variation=f(Vbus)), and also the Vbus variation itself, are sufficiently compensated such that they do not significantly affect the output power of the resonant converter.

Figure 9:
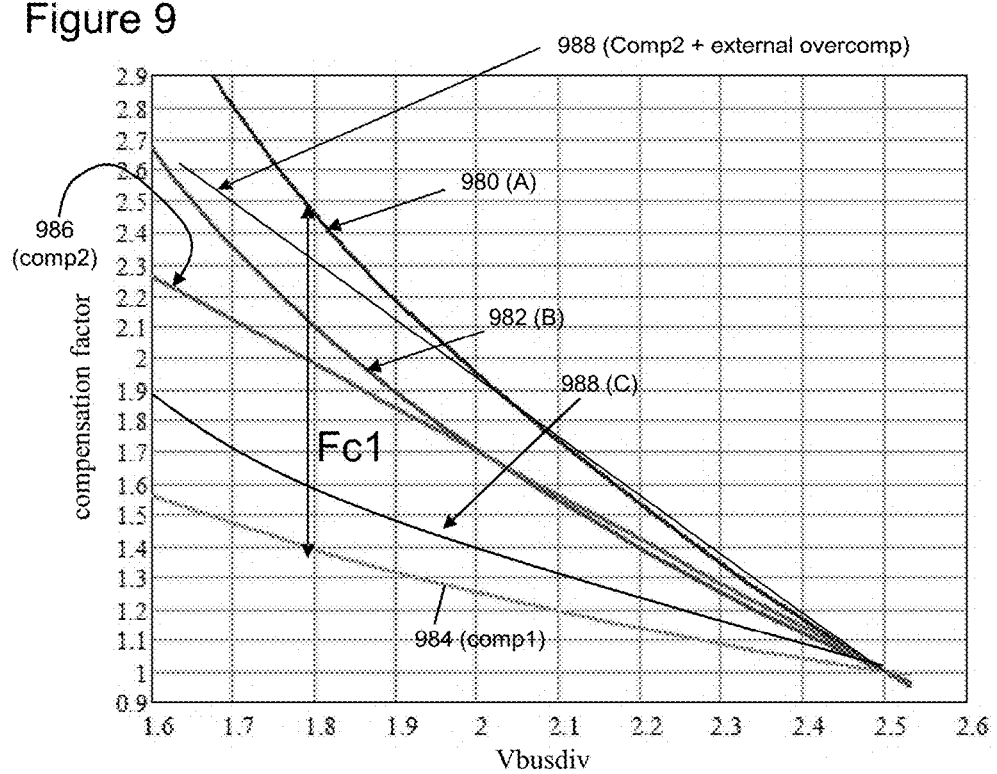
FIG. 9 shows a graph that is used to describe compensation of the two different resonant converter designs represented by FIG. 8.

FIG. 9 shows a graph that will be used to describe such compensation.

The voltage level of Vbusdiv (the signal at the Vbusdiv-output-terminal of the Vbus-compensation-network) is shown on the horizontal axis. Compensation factor is shown on the vertical axis, which can be considered as a relative multiplication factor that is required for deltaVcr in the power equation that is discussed above. When the level of Vbusdiv is at the expected value of 2.5V, the compensation factor is 1. That is, no over- or under-compensation is required for the resonant converter to provide the correct output power.

Optimum compensation curves for converters A, B and C are shown with reference numbers 980, 982 and 988 respectively. That is, application of the compensation factors represented by the compensation curve 980 to the power equation for a converter with design A will result in optimum output power regulation. Similarly, application of the compensation factors represented by the compensation curves 982, 988 to the power equation for a converter with designs B and C will result in optimum output power regulation. Therefore, it will be appreciated that different converter designs require different degrees of compensation.

As shown in FIG. 9, converter A 980 needs a steeper compensation curve than converter B 982. Therefore, if a single compensation curve was selected for one of the designs, its use for the other designs would result in sub-optimal compensation. That is, the other designs would be under- or over-compensated. According to one or more of the embodiments disclosed herein, advantageously a fixed internal compensation can be applied (for example by software in the controller), along with an element of external overcompensation that is tuned to achieve proper compensation for a specific design.

In FIG. 9, a first internal compensation curve 984 is shown. The first internal compensation curve 984 represents compensation according to 1/Vbus as an approximation of how variations in Vbus affect the output power. It can be seen from FIG. 9 that the first internal compensation curve 984 does not provide sufficient compensation for either converter design A 980, converter design B 982, or converter design C 988.

FIG. 9 also shows a second internal compensation curve 986. The second internal compensation curve 986 provides good optimisation for the converter design B, but insufficient compensation for converter design A 980. An external+internal compensation curve 988 is also shown in FIG. 9. The external+internal compensation curve 988 is provided by a combination of (i) second internal compensation curve 986, and (ii) an external overcompensation factor that can be implemented by the circuits of FIG. 5a, 5b or 6, for example. As can be seen in FIG. 9 the external overcompensation factor is selected such that the external+internal compensation curve 988 is suitable for converter design A.

In relation to converter design C 988, a Vbus-compensation-network can be used to apply a compensation factor (Fc) that is less than 1 to the second internal compensation curve 986. An example of such a Vbus-compensation-network is mentioned with reference to FIGS. 5a and 6 (although not shown in FIGS. 5a and 6), in that the third-resistor can be connected to the reference terminal instead of the Vbus-input-terminal.

Therefore, when the controller determines how to control the switching of the resonant converter in accordance with the power equation, due to external overcompensation factor, it will be using an inflated value for Vbusdiv and therefore will provide over-compensation. The inflated value of Vbusdiv can be seen in FIG. 7b where the amplitude of the ringing in the vbusdiv signal is increased. Since the level of this over-compensation can be externally net by selecting appropriate component values for the Vbus-compensation-network, a single controller (with a fixed internal compensation factor) can be conveniently used with different types of resonant converters, because any top-up compensation that is required to the internal compensation factor can easily be set and applied by the Vbus-compensation-network.

The degree of internal compensation provided by the second internal compensation curve 986 can be considered appropriate in some applications. This is because: for the converter design B 982, the internal compensation can be used without any significant external compensation; and for converter designs A 980 and C 988, the internal compensation can be used along with an external compensation network. By choosing second internal compensation curve 986 as the fixed internal compensation, the additional compensation factor to be realized externally can be relatively low, in that way minimizing or reducing the effect, as discussed above with reference to FIG. 7a, of the incorrect sensing of Vbus after starting up the PFC, which can cause Vbus to be lower than desired shortly after starting up the PFC In some applications it can be considered better to apply the second internal compensation curve 986 instead of the first internal compensation curve 984 because the external compensation factor required is smaller. In this example, the external compensation factor required to compensate for converter A 980 from the second internal compensation curve 986 is about 1.25 (2.5/2). This is in contrast to the external compensation factor that would be required to compensate from the first internal compensation curve 984, which would be approximately a factor of 1.78 (2.5/1.4) (as shown in FIG. 9 as 'Fc1'). With no internal compensation whatsoever, the compensation factor Fc would be even larger, about 2.5. Requiring external compensation from the first internal compensation curve, or with no internal compensation curve, could result in an unacceptable issue with a control loop for a power factor correction circuit that provides the bus voltage Vbus.

The instructions and/or flowchart steps in the above Figures can be executed in any order, unless a specific order is explicitly stated. Also; those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or to multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected net of details. However, a person of ordinary skill in the art would understand that many other example embodiments may be practiced which include a different selected set of these details. It is intended that the following claims cover all possible example embodiments.

The invention claimed is:

1. A resonant converter circuit comprising:
   a controller having a Vbusdiv-input-terminal configured to receive a Vbusdiv-input-signal and control operation of the resonant converter circuit in accordance with the Vbusdiv-input-signal; and
   a Vbus-compensation-network comprising: a Vbus-input-terminal configured to directly receive a bus voltage signal having both an AC component and a DC component; a Vbusdiv-output-terminal configured to provide the Vbusdiv-input-signal directly to the controller; a reference terminal; an AC-impedance-network connected between the Vbus-input-terminal and the Vbusdiv-output-terminal, wherein the AC-impedance-network is configured to apply an AC transfer function to the AC component of the received bus voltage signal; and a DC-impedance-network connected between the Vbus-input-terminal and the Vbusdiv-output-terminal, wherein the DC-impedance-network is configured to apply a DC transfer function to the DC component of the received bus voltage signal, wherein the DC transfer function is different from the AC transfer function.

2. The resonant converter circuit of claim 1, wherein the AC-impedance-network comprises:
a capacitor and a third-impedance connected in series directly between the Vbusdiv-output-terminal and the Vbus-input-terminal.

3. The resonant converter circuit of claim 2, wherein the third-impedance is configured to contribute to the AC transfer function, but not the DC transfer function.

4. The resonant converter circuit of claim 2, wherein the AC-impedance-network further comprises:
a first-impedance connected directly between the Vbus-input-terminal and the Vbusdiv-output-terminal.

5. The resonant converter circuit of claim 4, wherein the AC-impedance-network further comprises:
a second-impedance connected directly between the Vbusdiv-output-terminal and the reference-terminal.

6. The resonant converter circuit of claim 4, wherein the DC-impedance-network comprises:
the first-impedance and not the third-impedance of the AC-impedance-network.

7. The resonant converter circuit of claim 5, wherein the DC-impedance-network comprises the second-impedance.

8. The resonant converter circuit of claim 1, wherein the Vbus-compensation-network is configured to apply an external compensation factor to the received bus voltage signal when generating the Vbusdiv-input-signal.

9. The resonant converter circuit of claim 1, wherein the controller further comprises:
a control-input terminal configured to receive a control-input-signal; and
a control-output-terminal configured to provide a control-output-signal for controlling the resonant converter, wherein the controller is configured to determine the control-output-signal based on the Vbusdiv-input-signal and the control-input-signal.

10. The resonant converter circuit of claim 9, wherein the control-output-signal is configured to control a state variable of the resonant converter.

11. The resonant converter circuit of claim 10, wherein the state variable comprises one or more of a primary current and a voltage across a resonant capacitor.

12. The resonant converter circuit of claim 9, wherein the control-output-signal is configured to control a frequency of operation of the resonant converter.

13. The resonant converter circuit of claim 9, wherein the controller is configured to apply an internal compensation factor to the Vbusdiv-input-signal in order to determine the control-output-signal.

14. The resonant converter circuit of claim 1, wherein the AC-impedance-network comprises:
a capacitor and a third-impedance connected in series directly between the Vbusdiv-output-terminal and the reference terminal.

15. The resonant converter circuit of claim 2, wherein the AC-impedance-network further comprises a fourth-impedance, an additional-divider-node is defined directly between the third-impedance and the capacitor that are connected in series, and the fourth-impedance is connected directly between the additional-divider-node and the reference terminal.

16. A resonant converter circuit comprising:
a controller having a Vbusdiv-input-terminal configured to receive a Vbusdiv-input-signal and a control-output-terminal configured to control a resonator converter output voltage, wherein the controller is configured to control operation of the resonant converter in accordance with the Vbusdiv-input-signal; and
a Vbus-compensation-network comprising: a Vbus-input-terminal configured to directly receive a bus voltage signal having both an AC component and a DC component from a voltage source, wherein the resonator converter output voltage and the bus voltage signal are different; a Vbusdiv-output-terminal configured to provide the Vbusdiv-input-signal directly to the controller; a reference terminal; an AC-impedance-network connected between the Vbus-input-terminal and the Vbusdiv-output-terminal, wherein the AC-impedance-network is configured to apply an AC transfer function to the AC component of the received bus voltage signal; and a DC-impedance-network connected between the Vbus-input-terminal and the Vbusdiv-output-terminal, wherein the DC-impedance-network is configured to apply a DC transfer function to the DC component of the received bus voltage signal, wherein the DC transfer function is different from the AC transfer function.

* * * * *